United States Patent
Mitze

(10) Patent No.: US 11,267,029 B2
(45) Date of Patent: Mar. 8, 2022

(54) METHOD FOR STRAIGHTENING OF RADIAL RUN-OUT FAULTS OR LINEARITY FAULTS ON ELONGATE WORKPIECES, AND MEASURING DEVICE, STRAIGHTENING MACHINE, AND STRAIGHTENING SYSTEM THEREOF

(71) Applicant: MAE Maschinen- und Apperatebau Götzen GmbH, Erkrath (DE)

(72) Inventor: Manfred Mitze, Wetter (DE)

(73) Assignee: MAE Maschinin- und Apperatebau Gotzen GmbH, Erkrath (DE)

( * ) Notice: Subject to any disclaimer, the term of this patent is extended or adjusted under 35 U.S.C. 154(b) by 120 days.

(21) Appl. No.: 16/239,837

(22) Filed: Jan. 4, 2019

(65) Prior Publication Data

US 2019/0210082 A1  Jul. 11, 2019

(51) Int. Cl.
*G01B 3/50* (2006.01)
*B21D 3/16* (2006.01)
(Continued)

(52) U.S. Cl.
CPC ........... *B21D 3/16* (2013.01); *B21C 51/00* (2013.01); *B21D 3/10* (2013.01); *G01B 5/202* (2013.01);
(Continued)

(58) Field of Classification Search
CPC ........... G01B 5/202; G01B 7/283; B21D 3/16
(Continued)

(56) References Cited

U.S. PATENT DOCUMENTS 3,936,946 A * 2/1976 Ruffner ................ G01B 7/146
33/556
4,137,642 A * 2/1979 Halvarsson ............ G01B 5/202
33/501.11

(Continued)

FOREIGN PATENT DOCUMENTS

| DE | 19920003 | 11/2000 |
|---|---|---|
| EP | 2055403 | 6/2009 |
| WO | 199323183 | 11/1993 |

*Primary Examiner* — George B Bennett
(74) *Attorney, Agent, or Firm* — Ulmer & Berne LLP; Brian Turung

(57) ABSTRACT

In the straightening of radial run-out faults or linearity faults on elongate workpieces having at least one toothed region having peaks and troughs of the teeth of said toothed region, such as on toothed shafts or toothed racks, for ascertaining deviations from the ideally straight workpiece, the locations of the surfaces of the not yet straightened workpiece that form a reference plane are scanned at least at points or in portions on or in the region on the active reference circle or pitch circle, respectively, of the toothing that lies between the peaks and troughs of the teeth. The resulting measured items of data are utilized by the straightening machine such that a workpiece that is as ideally straight as possible at least in the toothed region is achieved by the straightening. The elevated locations of the tooth heads of the toothed region that form the peaks of the teeth and the elevated locations of neighboring tooth surfaces that lie in the reference plane are detected, and the height differentials of the elevated locations of the tooth heads in relation to the elevated locations of neighboring tooth surfaces that lie in the reference plane are ascertained. The height differentials are utilized by the straightening machine as corrective measured items of data such that said height differentials are considered when straightening the workpiece so as to form a workpiece that is as ideally straight as possible in the reference plane.

10 Claims, 2 Drawing Sheets

(51) Int. Cl.
*B21C 51/00* (2006.01)
*B21D 3/10* (2006.01)
*G01M 13/021* (2019.01)
*G01B 11/24* (2006.01)
*G01B 7/28* (2006.01)
*G05B 19/401* (2006.01)
*G01B 5/20* (2006.01)
*G01B 7/012* (2006.01)

(52) U.S. Cl.
CPC .......... *G01B 7/283* (2013.01); *G01B 11/2416* (2013.01); *G01M 13/021* (2013.01); *G05B 19/401* (2013.01); *G01B 7/012* (2013.01)

(58) Field of Classification Search
USPC ........ 73/162; 33/533, 501.7, 501.11, 501.12, 33/501.14
See application file for complete search history.

(56) References Cited

U.S. PATENT DOCUMENTS

| | | | | |
|---|---|---|---|---|
| 4,276,699 A | * | 7/1981 | Sterki | G01B 7/283 33/501.9 |
| 4,646,443 A | * | 3/1987 | Hofler | G01B 7/283 33/501.15 |
| 5,622,075 A | * | 4/1997 | Deutschewitz | B21D 3/10 72/387 |
| 7,458,164 B2 | * | 12/2008 | Perret | F01L 1/02 33/1 N |
| 8,091,247 B2 | * | 1/2012 | Nagata | G01B 5/202 33/501.13 |
| 9,539,635 B2 | * | 1/2017 | Mitze | B21D 43/006 |
| 9,719,767 B2 | * | 8/2017 | Knabel | G01M 13/023 |
| 2003/0206031 A1 | * | 11/2003 | Harris | G01R 1/07314 324/750.22 |
| 2015/0338201 A1 | * | 11/2015 | Wuerfel | B23F 23/1218 700/160 |
| 2019/0160506 A1 | * | 5/2019 | Moser | B21D 3/10 |

* cited by examiner

METHOD FOR STRAIGHTENING OF RADIAL RUN-OUT FAULTS OR LINEARITY FAULTS ON ELONGATE WORKPIECES, AND MEASURING DEVICE, STRAIGHTENING MACHINE, AND STRAIGHTENING SYSTEM THEREOF

TECHNICAL FIELD OF THE INVENTION

The invention relates to a method for straightening radial run-out faults or linearity faults on an elongate workpiece having at least one toothed region, such as on a toothed shaft or a toothed rack, having the features of the preamble of claim 1, 2, or 5; to a measuring device therefor; and to a straightening machine, or a straightening system, respectively. It is accordingly provided that for ascertaining deviations from the ideally straight workpiece, reference values such as the locations of the surfaces of the not yet straightened workpiece that form a reference plane are scanned at least at points or in portions on or at or in the region of the toothing, however at least more or less close to the reference circle of the active toothing, or the active pitch circle of the toothing that lies between the peaks and troughs of the teeth, and the resulting measured items of data are utilized by the straightening machine in such a manner that a workpiece that is as ideally straight as possible at least in the toothed region is achieved by the straightening. Ball immersion measures of a ball measuring head or other geometric values of the respective toothing geometry known per se are furthermore considered as reference values.

TECHNOLOGICAL BACKGROUND

The steering of passenger vehicles nowadays is practically performed exclusively by systems having pinions and toothed racks, typically assisted by electric or hydraulic servo drives. The toothed racks used are heat treated because of the high stress and the required resistance to wear; a heavy distortion of up to 10 mm in terms of curvature of arises herein.

The subsequent use of the toothed racks requires tight linearity tolerances down to 0.05 mm. In the manufacture of such toothed racks, automatic straightening machines, such as is known from WO 93/23183, for instance, have therefore been in use for a long time. The linearity in such systems is typically measured in a tactile manner, the sensors used detecting the location/position of the teeth on the tooth head.

However, it is not the linearity of the toothed rack in the plane of the tooth heads which is relevant to the later functions of the toothed rack, but the linearity in the reference circle of the active toothing. When the toothed racks are produced by a subtractive production method the dimensional of spacing between the tooth head and the reference circle is very consistent. Measuring the tooth head is thus sufficient so as to also ensure a linearity of the active toothed region.

However, a steadily increasing proportion of toothed racks is produced by a solid-forming process such as is mentioned in DE 199 20 003 A1, for instance. The toothing herein is produced in the final state by way of a forging tool in a forging press without any mechanical post-processing. However, for various reasons the spacing between the tooth head and the reference circle cannot be reliably produced in a consistent manner when forming. The height of the tooth head rather varies from one batch to another by up to 0.2 mm. However, significant bandwidths of variation are also present across the length of the toothing of a single workpiece as well as from one workpiece to another.

This leads to the measuring technology of the straightening system having to be calibrated from one batch to another; moreover a reduction of the set straightening tolerance is required because of the variation within one workpiece and from one workpiece to another, this having corresponding negative consequences in terms of the cycle time. Moreover, when measuring of the reference circle plane is not performed, or measuring is not performed at least more or less close to the active pitch circle of the toothing that lies between the peaks and troughs of the teeth, a reliability of the linearity measurement to the extent of 100% cannot be achieved, in particular also in the case of a faulty calibration.

A measurement in the reference circle plane, or at least more or less close to the active pitch circle of the toothing that lies between the peaks and troughs of the teeth, instead of on the tooth head, would thus be a prerequisite for an improvement of the straightening process of formed toothed racks. However, this to date is barely possible in a process-reliable manner using conventional tactile measuring technology. Instead, an optical, in particular laser-based, non-contacting measurement such as is described in EP 2 055 403 A2, can in principle be used for achieving the targeted improvement, the full content of the disclosure of EP 2 055 503 A2 being incorporated herein by reference. As can be seen from FIG. 6B therein, presently reproduced as FIG. 1 relating to the prior art, an elongate workpiece 2', for example in the shape of a steering toothed rack having an axial toothing is chucked between rotatable centers 5' of a straightening system. A straightening hammer 3' that is repositionable parallel with the rotation axis of the steering toothed rack acts on the steering toothed rack that is mounted by straightening anvils 4' which are axially mutually spaced apart and are disposed on a straightening table 6' during the straightening procedure. A laser sensor 1' that emits a measuring light beam ML' conjointly with the straightening hammer 3' is repositionable parallel with the rotation axis of the steering toothed rack. In a measuring pass that is to be carried out before the straightening procedure, the measuring light beam ML' for ascertaining deviations from the ideally straight workpiece scans in a non-contacting manner the toothed region at least at points or in portions at least more or less close to the active pitch circle of the toothing that lies between the peaks and troughs of the teeth. The resulting measured items of data are utilized by the straightening system in such a manner that a workpiece that is as ideally straight as possible at least in the toothed region is achieved by the straightening. However, the use of the non-contacting measuring has often been omitted to date because the non-contacting measurement can often not be used without disruptions because of the surface contamination that is not always avoidable in the environment of real-world production. On the other hand, the measurement by laser costs time which compromises the efficiency of the straightening system.

PRESENTATION OF THE INVENTION

An objective of the present invention is an improvement of the measurement of toothings, in particular with a view to an efficient straightening procedure. In particular, a measuring technology which ideally operates without any temporal delay, preferably in a potentially contamination-rich mechanical workpiece production and processing environment is desirable. To this end, the invention proposes a method having the features of claim 1 or 2. Accordingly, the elevated locations of the tooth heads of the toothed region that form the peaks of the teeth (hereunder also referred to as the tooth head dimensions) are detected and processed in terms of controlling/regulating technology, and preferably also the elevated locations of neighboring tooth surfaces that lie in the reference plane (hereunder also referred to as the spherical dimensions), and according to claim 2 the height differentials of the elevated locations of the tooth heads in relation to the elevated locations of neighboring tooth surfaces that lie in the reference plane are ascertained, and the height differentials are utilized by the straightening machine as corrective measured items of data such that said height differentials are considered when straightening the workpiece so as to form a workpiece that is as ideally straight as possible in the reference plane.

It is inter alia achieved by the invention that the straightening hammer of a straightening system of such workpieces, despite varying tooth head reference circle spacings of the teeth on toothed shafts or on toothed racks, can exert the deformation forces of said straightening hammer directly onto the tooth heads without the intervention of auxiliary tools, so as to in a reference plane lying below the tooth heads, such as more or less close to the active pitch circle of the toothing that lies between the peaks and troughs of the teeth, form the non-straightened workpiece to a workpiece that is as ideally straight as possible.

It is now possible for the invention to be embodied in various ways. A tactile measuring device having a ball caliper can thus be provided, said tactile measuring device in a first step being provided only for determining the dimensional difference between the tooth head and the ball caliper. It is possible herein for a comparatively small ball caliper (measuring ball) in terms of diameter to be allowed to slide up and down on all tooth flanks by a sufficiently slow axial repositioning of the measuring device relative to the toothing of the workpiece. Not only the difference in terms of dimensions but the entire toothing contour can thus be detected. Alternatively, for instance in order for the measuring method to be accelerated, individual measuring positions at which height or differential measurements, respectively, are in each case performed can be determined and approached.

In principle, it is possible for the determination of the difference in terms of dimensions to be integrated in the straightening machine. The issues described in non-contacting measurements would be avoidable at the cost of an extended cycle time, and significant cost advantages would moreover result.

A particularly efficient detection of the height differential values is achieved when the measuring installation is equipped having a measuring head that is movable on the measuring installation, and having a stop region that is disposed on the measuring head, as well as having a measuring sensor that is disposed on the measuring head and movable on the measuring head. The stop region during the measuring of the toothed region of the workpiece is guided along the peaks of the teeth of the toothed region. The measuring sensor during the guiding of the stop region of the measuring head along the contour of the toothing is guided up and down. The position(s), in particular the height(s), of the measuring sensor and the position(s), in particular the height(s), of the measuring head herein are detected in a sensory manner. The stop region accordingly slides along the peaks on the teeth, and the ball of the measuring sensor meanwhile moves up and down along the contour of the toothing, or the teeth, respectively.

It is particularly preferable, and without the characterizing features of claim 1 also of independent inventive significance, for the measuring of toothings according to claim 5 to be relocated outside so as to be ahead of the straightening system. The application of such an upstream external measuring of toothings is not limited to only elongate toothings but is applicable to all time-intensive measuring operations of which the results are to preferably be incorporated in the straightening process and/or in the measurement protocols of the straightening system. This includes in particular encircling ring gear toothings or spline gear toothings, or else geometric features such as diameters or length dimensions.

Since the measuring procedure in the case of an upstream external measuring of toothings preferably takes place in a manner temporally parallel with the straightening of the preceding measured workpiece, the inevitably higher temporal effort for the tactile or a non-contacting, for example optical, measuring of toothings does not have any effect on the cycle time of the straightening. Straightening times between 30 and 70 seconds are usually required. Even all tooth gaps could optionally be measured in a tactile or non-contacting manner within such a duration. The measured items of data can preferably be transmitted to a common controlling installation or to a common controlling and regulating installation, whereby the common controlling/regulating installation controls/regulates the measuring of the workpiece and the straightening of the workpiece.

The method having a measuring of toothings outside the straightening machine proceeds such that a first workpiece is measured before being fed to the straightening machine by suitable conveying means. The measured items of data are transmitted to the controller. While the first measured workpiece is straightened in the straightening machine, a second workpiece is already being measured ahead of the straightening machine. The cycle time of the entire workpiece processing is significantly optimized by this process management of simultaneously measuring and straightening two workpieces. Said optimization in practice means that it is possible for most production sequences which provide a straightening procedure to be operated more rapidly, on account of which the number of required straightening machines can be reduced. In terms of the workpiece producer or workpiece processor, respectively, this means a significant saving in costs which is substantially achieved in that on account of the method sequence according to the invention, cycle times can be shortened without any loss of quality, and straightening procedures can be accomplished more rapidly without any loss of quality.

The relocated measuring of toothings in the case of favorable environmental conditions can also be equipped with a non-contacting measuring technology, as has already been mentioned. In this instance it would be advantageous for the toothing herein to also be able to be scanned in a stripe-shaped manner such that not only measured values along the centerline of the toothing but across the entire tooth width are capable of being determined in this instance. Detection of the difference in terms of dimension is typically endeavored to be carried out in a tactile manner because of the practical problems stated, but also in order for costs to be reduced.

The measuring device can either have a dedicated base frame or advantageously be integrated in a conveying section (for example a chain conveyor) of the straightening system that is present anyway. The transfer to the straightening machine is preferably performed by way of installations already present (walking-beam conveyor, loading gantry, robot, or similar).

The workpiece-specific items of data such as specific longitudinal positions, for example for measuring the height differentials of the tooth heads in relation to the positions of neighboring tooth surfaces that lie in the reference plane, that are required for controlling the devices are preferably stored in the controller of the straightening machine. Accordingly, only a single controller which, in particular simultaneously, controls the straightening procedure and the measuring procedure is required, this improving the efficiency of the straightening procedure and having the effect of reducing the costs.

An improvement of the measuring of toothings finally results from a straightening machine and from a straightening system. The straightening machine is capable of being coupled to a conveying installation having a conveying section, or is coupled to the latter. A workpiece is fed to the straightening machine by way of the conveying installation, and is again discharged from the straightening machine by way of the latter. The straightening machine comprises a measuring device, in particular a measuring device described herein, for measuring toothings, wherein the measuring device is capable of being integrated in a conveying section of the conveying installation provided ahead of the straightening machine, or is integrated thereto. The straightening machine and the measuring device are connected by at least one data line for exchanging measured items of data for straightening the workpiece. In the case of the straightening system, a straightening machine for straightening radial run-out faults or linearity faults on an elongate workpiece, and a measuring device having a measuring head for measuring the toothing of the toothed region of the elongate workpiece are provided. The straightening system is suitable for using or carrying out a straightening method described herein. The straightening machine and the measuring device of the straightening system are connected to one another by a data line, wherein the measuring device is preferably formed according to a measuring device described herein.

The aforementioned claimed components described in the exemplary embodiments and to be used according to the invention in terms of the size, shape, selection of material, and technical concept thereof are not subject to any particular exceptional conditions such that the selective criteria known in the field of application can be applied without limitation.

Further details, features, and advantages of the subject matter of the invention are derived from the dependent claims as well as from the description hereunder of the associated drawing and table in which an exemplary embodiment of a bend-straightening machine for straightening radial run-out faults or linearity faults on elongate workpieces having at least one toothed region such as on toothed shafts or on toothed racks is illustrated in an exemplary manner. Individual features of the claims or of the embodiments can also be combined with other features of other claims and embodiments.

In summary, the invention is directed to a method for straightening radial run-out faults or linearity faults on an elongate workpiece having at least one toothed region having peaks and troughs of the teeth of said toothed region, such as on a toothed shaft or a toothed rack, whereby for ascertaining deviations from the ideally straight workpiece, reference values, in particular the locations of the surfaces of the not yet straightened workpiece that form a reference plane, are scanned at least at points or in portions on or at or in the region of the toothing, however at least more or less close to the in particular active reference circle that lies between the peaks and troughs of the teeth; and whereby the resulting measured items of data are utilized by a straightening machine such that a workpiece that is as ideally straight as possible at least in the toothed region is achieved by the straightening; wherein the elevated locations of neighboring tooth surfaces that lie in the reference plane are detected in a tactile manner; and wherein the elevated locations of neighboring tooth surfaces that lie in the reference plane are utilized by the straightening machine as corrective measured items of data such that said elevated locations are considered when straightening the workpiece so as to form a workpiece that is as ideally straight as possible in the reference plane. The method can optionally include the steps wherein the elevated locations of the tooth heads of the toothed region that form the peaks of the teeth, and the elevated locations of neighboring tooth surfaces that lie in the reference plane are detected; wherein the height differentials of the elevated locations of the tooth heads in relation to the elevated locations of neighboring tooth surfaces that lie in the reference plane are ascertained; and wherein the height differentials are utilized by the straightening machine as corrective measured items of data such that said height differentials are considered when straightening the workpiece so as to form a workpiece that is as ideally straight as possible in the reference plane. The method can optionally include a tactile measuring installation (20) having a ball caliper is used for determining the height differentials. The method can optionally include a ball caliper (26) of the measuring installation (20) that slides up and down on the tooth flanks of the teeth (31) of the toothed region (30A). The method can optionally include the steps wherein measuring of the workpiece, in particular of the toothed region of the workpiece, that is performed before the straightening of the workpiece is relocated out of a straightening machine so as to be ahead of the straightening machine, and/or wherein measuring of the workpiece, in particular of the toothed region of the workpiece, that is performed before the straightening of the workpiece is performed outside a straightening machine for straightening the workpiece. The method can optionally include the scanning of the toothed region is performed in a tactile and/or non-contacting and/or optical manner. The method can optionally include the step wherein the measured items of data are transmitted to a common control installation (42) or to a common controlling and regulating installation, whereby the common controlling/regulating installation (42) controls/regulates the measuring of the workpiece and the straightening of the workpiece. The method can optionally include the step wherein measuring of the toothed region (30A) of a second workpiece is performed while a first, previously measured, workpiece is being straightened. The method can optionally include the step wherein a measuring installation (20) for measuring toothings is integrated in a conveying section of a conveying installation (41) of the straightening machine that is to be provided ahead of the straightening machine (40). The invention is also directed to a a measuring installation (20) to perform the method of the invention wherein the measuring installation has a measuring head (21) that is movable on the measuring installation (20); having a stop region (32) that is disposed on the measuring head (21); and having a measuring sensor (25) that is disposed on the measuring head (21) and movable on the measuring head (21); wherein the stop region (32) during the measuring of the toothed region (30A) of the workpiece (30) is guided along the peaks of the teeth (31) of the toothed region (30A); wherein the measuring sensor (25) during the guiding of the stop region (32) of the measuring head (21) along the contour of the toothing (30A) is guided up and down; and wherein the position, in particular the height, of the measuring sensor (25), and/or the position, in particular the height of the measuring head (21), is detected in a sensory manner. The measuring device optionally has at least one measuring head (21) that is repositionable along a slide guide (22) parallel with an elongate workpiece (30) to be straightened, said workpiece (30) having a toothed region (30A); comprising means for ascertaining the height differentials between the tooth heads (31A) that form the peaks of the teeth (31) of a toothed region (30A) and the neighboring locations of the surfaces of the workpiece (30) that form a reference plane on or at or in the region of the toothing, however at least more or less close to the in particular active reference circle that lies between the peaks and troughs of the teeth (31); and means for ascertaining deviations from an ideally straight workpiece (30). The measuring device optionally has the means for ascertaining the height differentials, and the means for ascertaining deviations are combined in a functional group or so as to form the latter. The measuring device optionally has comprises a height-adjustable stop region (32) which is capable of being placed onto the peak of the teeth (31) of the toothed region (30A) and/or is capable of being guided along the peaks; and comprising a height-adjustable measuring sensor (25) which is disposed on the measuring device so as to be movable relative to the height of the stop region (32) and which is capable of being guided along the contour of the toothed region (30A). The invention is also directed to a straightening machine (40) for straightening radial run-out faults or linearity faults on elongate workpieces (30) having at least one toothed region (30A), such as of toothed shafts or toothed racks, in particular for carrying out the method of the present invention, and/or for using a measuring device of the present invention, wherein said straightening machine (40) comprises a measuring installation (20) for measuring toothings, said measuring installation (20) being integrated in a conveying section of a conveying installation (41) that is provided ahead of the straightening machine (40). The invention is also directed to a straightening system comprising a straightening machine (40) for straightening radial run-out faults or linearity faults on an elongate workpiece (30) having at least one toothed region (30A), such as of a toothed shaft or a toothed rack, in particular comprising a straightening machine of the present invention, and comprising a measuring device having a measuring head (21) for measuring the toothing of the toothed region (30A), wherein the straightening system carries out a straightening method of the present invention, wherein the straightening machine (40) and the measuring device are connected to one another by a data line, by the measuring device of the present invention. The straightening machine (40) or the straightening system wherein the measuring of the toothed region (30A) of the workpiece (30) is optionally performed at points, in particular at a plurality of measuring positions (x1, x2, x3), or wherein the measuring of the toothed region (30A) of the workpiece is performed continuously across the length of the toothed region (30A).

DETAILED DESCRIPTION OF EXEMPLARY EMBODIMENTS

Figure 1:
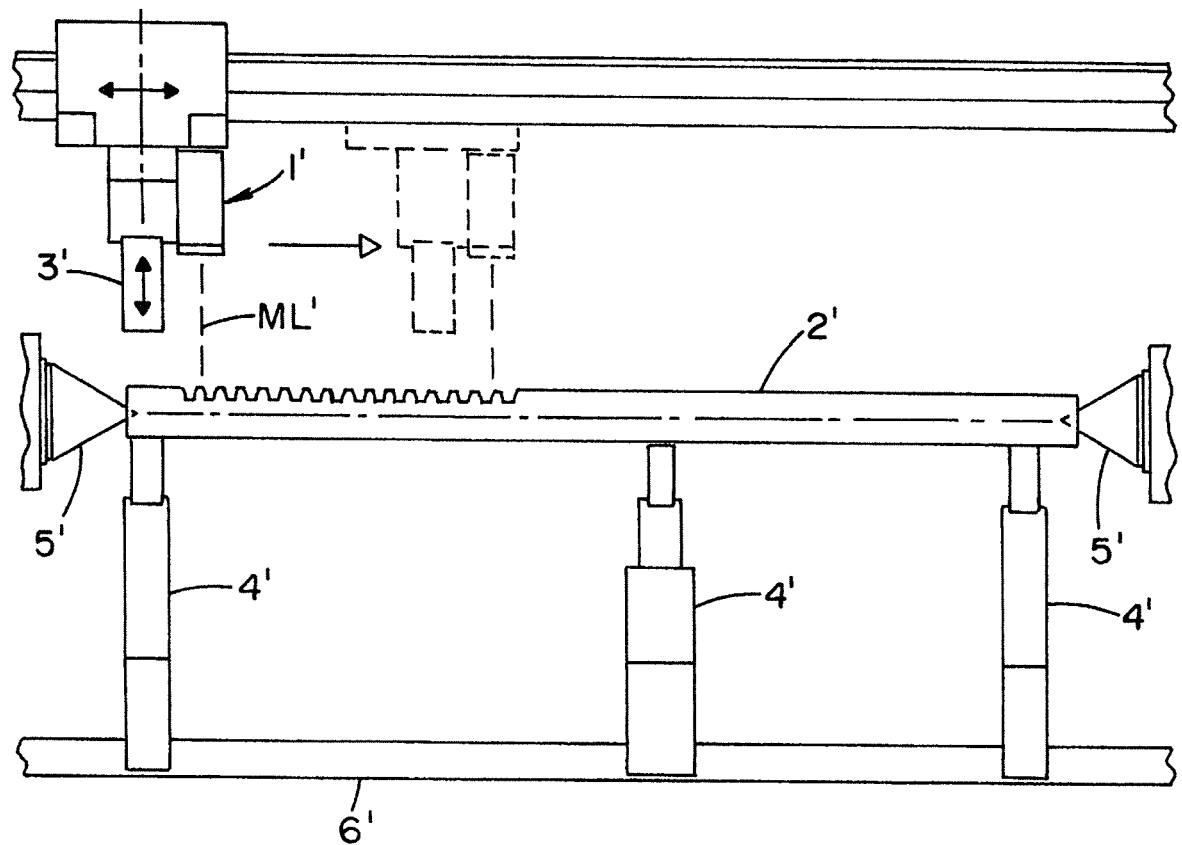
FIG. 1 shows a straightening system for toothed shafts or toothed racks according to the prior art (EP 2 055 403 A2), having a non-contacting measuring of toothings.
Figure 2:
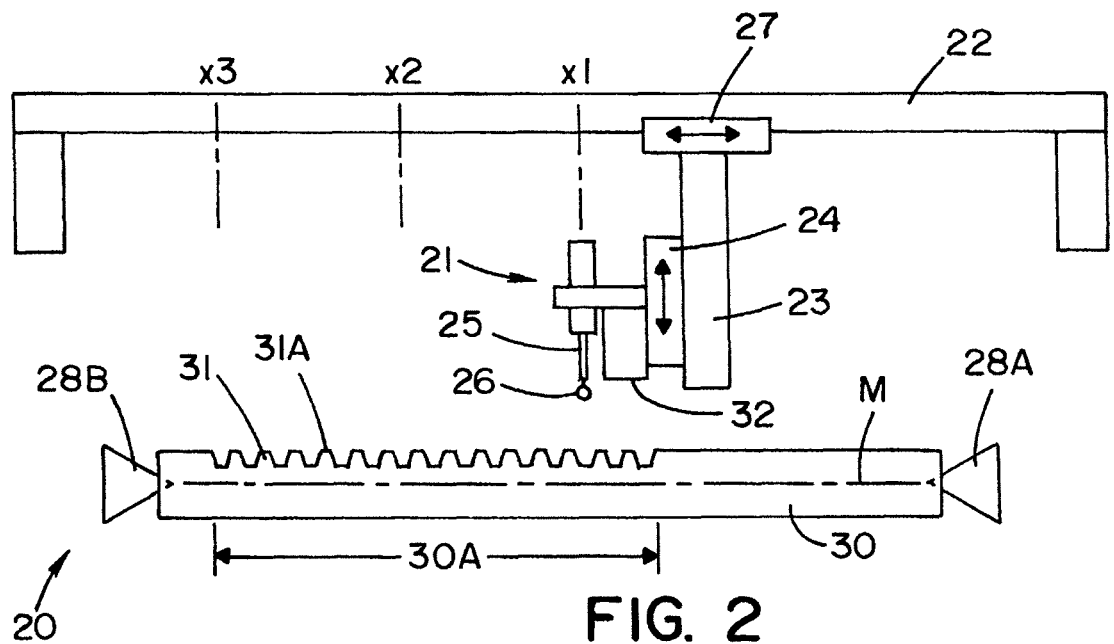
FIG. 2 shows a measuring installation according to the invention for ascertaining the height differentials between the tooth heads forming the peaks of the teeth of a toothed region and the neighboring locations of the surfaces of the not yet straightened workpiece that form a reference plane, more or less close to the active reference circle of the toothing that lies between the peaks and troughs of the teeth, and/or for ascertaining deviations from the ideally straight workpiece.

A measuring installation 20 can be derived from FIG. 2. A measurement of differences in tooth head dimensions in relation to spherical dimensions can be performed by way of the measuring installation. As can be seen from FIG. 2 and the following description thereof, a measuring installation 20 illustrated in an exemplary manner has both means for ascertaining the height differentials between the teeth heads that form the peaks of the tooth of a toothed region and the neighboring locations of the surfaces of the workpiece that form a reference plane on or at or in the region, at least however more or less close to the, in particular active, reference circle or pitch circle, respectively, of the toothing thereof that lies between the peaks and troughs of the teeth, and means for ascertaining deviations from an ideally straight workpiece 30 such as the toothed rack illustrated. Both means can be combined so as to form a functional group or so as to be in a latter. Said means are provided by an installation that serves for comparing the actual measured items of data in the reference plane and stored nominal data. The toothed region 30A or the entire workpiece 30 is initially aligned axially and in terms of the angular position thereof, wherein the teeth 31 point in the direction of a measuring head 21 of the measuring installation 20. The alignment means 28A, 28B illustrated can be but do not have to be machine tool centers known per se.

In order for the difference in terms of dimension to be detected, the measuring installation 20 has a slide guide 22 along which a driven slide 27 is repositionable. The slide 27 can thus be moved across the toothed length and/or across the entire workpiece length, for example to the positions x1, x2, or x3. The slide 27 also has a further slide guide 23 for a slide 24, said slide guide 23 preferably being disposed so as to be orthogonal to the slide guide 22. The measuring head 21 that is connected to said slide guide 23 is thus capable of being lowered from an upper resting position in the direction of the teeth. The stop region 32 bears on the teeth in the case of the lowered measuring head 21. The measuring head 21 is provided with a mechanically or preferably electrically effective, optionally retractable and deployable, in particular spring-loaded, measuring sensor 25 having a ball caliper 26 fastened thereto. The measuring sensor 25 completes an up-and-down movement when the stop region 32, bearing on the tooth heads of the teeth, is moved along the longitudinal extent of the workpiece.

A measuring procedure can comprise the following sequence of functions having the functional steps hereunder:

The preferably horizontally repositionable slide 27 is moved across the tooth gap/s to be measured (for example, x1, x2, or x3).

The preferably vertically repositionable slide 24 travels downward until the ball caliper 26 comes to sit on the respective tooth head 31A of the toothed rack.

The ball caliper 26 that is fastened to the measuring sensor 25 is displaced (upward in the exemplary embodiment) when coming to sit on the tooth head 31A and on each fundamentally arbitrary region of the tooth 31 lying therebeside. The "displacement paths" can be detected by the measuring head 21. The differences in terms of dimension (height differentials) of the elevated locations of the tooth heads in relation to the elevated locations of neighboring tooth surfaces lying in the reference plane are ascertained by way of said measured values.

The procedure is repeated for a plurality of, preferably all, tooth gaps to be measured.

Figure 4:
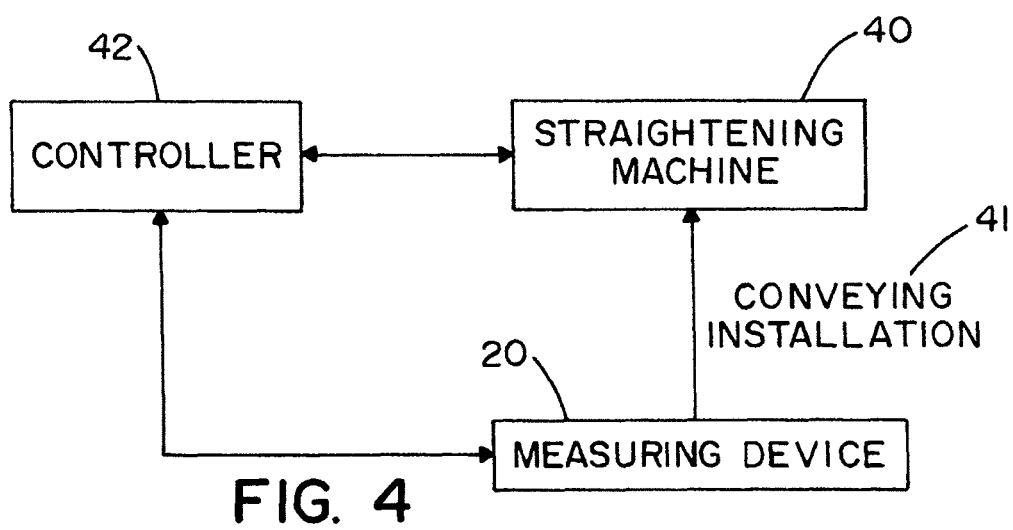
FIG. 4 shows a straightening machine having a measuring installation according to FIG. 2 (schematic, block diagram).

The associated differential values are also transmitted as the workpiece 30 is transferred to the straightening machine, for example according to FIG. 4, such that the actual straightening procedure can then be performed in a manner relative to the dimension of the tooth head.

The straightening machine controller by way of the known difference in terms of dimension can determine and display the spherical dimensions from the measured tooth head dimensions and the ascertained differences in terms of dimension achieved after the straightening procedure.

Figure 3:
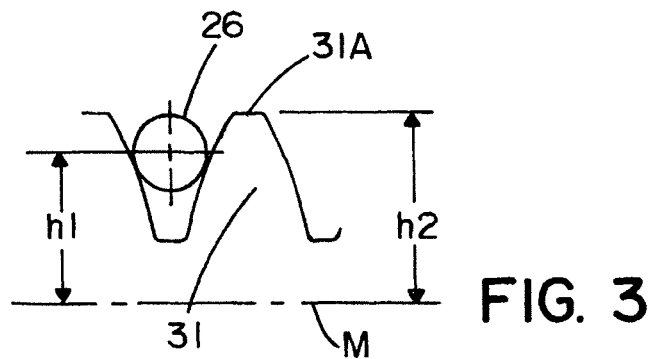
FIG. 3 shows a toothed rack according to FIG. 2 in a detailed illustration.

FIG. 3 shows an enlarged fragment of the toothed region 30A from FIG. 2. Illustrated is the spacing dimension $h2$ of the tooth head 31A from the workpiece centerline M, on the one hand, and the ball immersion dimension $h1$, on the other hand. This is understood to mean the spacing of a ball center from the workpiece center. The ball diameter is chosen such that said ball is a tangent to the tooth flanks (reference plane) approximately on the reference circle. The accuracy of the dimension $h1$ is decisive for the precise functioning of the workpiece, for instance in the case of the toothed rack, for example in a vehicle steering mechanism.

The measuring can preferably be performed outside the straightening machine. In order for the set of issues in terms of the increase of the cycle time of the straightening process by the spherical dimension detection to be circumvented, a relocation of the measuring of the toothing from the straightening machine 40, for example according to FIG. 2, can be provided such as can be seen, for example, in the block diagram according to FIG. 4, on account of which the measuring installation 20 is disposed upstream of the straightening machine 40. The differences in terms of dimension of "tooth head dimension $h2$ minus spherical dimension $h1$" ascertained by the measuring installation 20 are fed to the controller of the straightening machine 40, for instance by way of a data line. The straightening machine 40 in this instance operates only in terms of the tooth heads 31A but by way of the now known difference of tooth head dimension minus spherical dimension can measure and straighten indirectly according to the spherical dimension without losses in terms of cycle times being created. The instrumental arrangement of the straightening machine 40 and of the measuring installation 20 (disposed upstream or outside) forms a straightening system wherein straightening and measuring form processes that run in a mutually independent manner. The measuring station is placed according to the invention ahead of the straightening system. The results of the measuring station are incorporated in the sequence of the straightening process and, in as far as expedient, are documented together with the items of data detected in the straightening process.

LIST OF REFERENCE SIGNS

1' Laser sensor
2' Workpiece
3' Straightening hammer repositionable parallel with the rotation axis of the workpiece
4' Straightening anvil
5' Center
6' Straightening table
ML' Measuring light beam
20 Measuring installation
21 Measuring head
22 Slide guide
23 Slide guide
24 Slide
25 Measuring sensor
26 Ball caliper
27 Slide
28A Alignment means
28B Alignment means
30 Workpiece
30A Toothed region
31 Tooth
31A Tooth head
32 Stop region
40 Straightening machine
41 Conveying installation
42 Controller
h1 Spherical dimension
h2 Tooth head dimension
M Workpiece centerline
x1 Position
x2 Position
x3 Position

The invention claimed is:

1. A method for straightening radial run-out faults or linearity faults on an elongate workpiece having at least one toothed region having peaks and troughs of the teeth of said toothed region, such as on a toothed shaft or a toothed rack, whereby for ascertaining deviations from the ideally straight workpiece, reference values, in particular the locations of the surfaces of the not yet straightened workpiece that form a reference plane, are scanned at least at points or in portions on or at or in the region of the toothing, however at least more or less close to the in particular active reference circle that lies between the peaks and troughs of the teeth; and whereby the resulting measured items of data are utilized by a straightening machine such that a workpiece that is as ideally straight as possible at least in the toothed region is achieved by the straightening;

wherein the elevated locations of neighboring tooth surfaces that lie in the reference plane are detected in a tactile manner; and wherein the elevated locations of neighboring tooth surfaces that lie in the reference plane are utilized by the straightening machine as corrective measured items of data such that said elevated locations are considered when straightening the workpiece so as to form a workpiece that is as ideally straight as possible in the reference plane.

2. A method for straightening radial run-out faults or linearity faults on an elongate workpiece as claimed in the preamble of claim 1, wherein the elevated locations of the tooth heads of the toothed region that form the peaks of the teeth, and the elevated locations of neighboring tooth surfaces that lie in the reference plane are detected;

wherein the height differentials of the elevated locations of the tooth heads in relation to the elevated locations of neighboring tooth surfaces that lie in the reference plane are ascertained; and wherein the height differentials are utilized by the straightening machine as corrective measured items of data such that said height differentials are considered when straightening the workpiece so as to form a workpiece that is as ideally straight as possible in the reference plane.

3. The method as claimed in claim 1, wherein a tactile measuring installation-having a ball caliper is used for determining the height differentials.

4. The method as claimed in claim 3, wherein a ball caliper of the measuring installation slides up and down on the tooth flanks of the teeth of the toothed region.

5. A method as claimed in claim 1, wherein measuring of the workpiece, in particular of the toothed region of the workpiece, that is performed before the straightening of the workpiece is relocated out of a straightening machine so as to be ahead of the straightening machine, and/or wherein measuring of the workpiece, in particular of the toothed region of the workpiece, that is performed before the straightening of the workpiece is performed outside a straightening machine for straightening the workpiece.

6. The method as claimed in claim 5, wherein the scanning of the toothed region is performed in a tactile and/or non-contacting and/or optical manner.

7. The method as claimed in claim 5, wherein the measured items of data are transmitted to a common control installation or to a common controlling and regulating installation, whereby the common controlling/regulating installation controls/regulates the measuring of the workpiece and the straightening of the workpiece.

8. The method as claimed in claim 5, wherein measuring of the toothed region of a second workpiece is performed while a first, previously measured, workpiece is being straightened.

9. The method as claimed in claim 5, wherein a measuring installation for measuring toothings is integrated in a conveying section of a conveying installation of the straightening machine that is to be provided ahead of the straightening machine.

10. The method as claimed in claim 1, comprising a measuring installation having a measuring head that is movable on the measuring installation;

having a stop region that is disposed on the measuring head; and having a measuring sensor that is disposed on the measuring head and movable on the measuring head;

wherein the stop region during the measuring of the toothed region of the workpiece is guided along the peaks of the teeth of the toothed region;

wherein the measuring sensor during the guiding of the stop region of the measuring head along the contour of the toothing is guided up and down; and wherein the position, in particular the height, of the measuring sensor, and/or the position, in particular the height of the measuring head, is detected in a sensory manner.

* * * * *